United States Patent [19]

Challen et al.

[11] 4,347,261

[45] Aug. 31, 1982

[54] PROCESS FOR PREPARATION OF ALGIN OR PECTIN GELS

[75] Inventors: Ian A. Challen; Sandra East, both of Rushden; George R. Sanderson, Bedford, all of England

[73] Assignee: International Octrool Maatischappit "Octropa" B.V., Rotterdam, Netherlands

[21] Appl. No.: 171,674

[22] Filed: Jul. 24, 1980

Related U.S. Application Data

[63] Continuation of Ser. No. 74,375, Sep. 10, 1979, abandoned.

[30] Foreign Application Priority Data

Sep. 8, 1978 [GB] United Kingdom ............... 36085/78

[51] Int. Cl.³ ................................................. A23L 1/04
[52] U.S. Cl. ..................................... 426/573; 426/575; 426/577
[58] Field of Search ................ 426/573, 575, 577, 803

[56] References Cited

U.S. PATENT DOCUMENTS

| | | | |
|---|---|---|---|
| 2,786,763 | 3/1957 | Rivoche | 426/575 |
| 2,791,508 | 5/1957 | Rivoche | 426/575 |
| 2,878,127 | 3/1959 | Forkner | 426/577 |
| 3,367,784 | 2/1968 | Waitman | 426/577 |

*Primary Examiner*—Jeanette M. Hunter
*Attorney, Agent, or Firm*—Cushman, Darby & Cushman

[57] ABSTRACT

Edible alginate and low-methoxy-pectate gels are produced by rapidly mixing aqueous slurries containing finely divided foodstuff and particles of sparingly soluble solid, e.g. calcium sulphate, capable of releasing gelling agent into solution, throughout gellable aqueous alginate or low-methoxy-pectate sols, and then under shear-free conditions allowing the solid to release the gelling agent, e.g. calcium ions so that the mixture can gel.

8 Claims, No Drawings

PROCESS FOR PREPARATION OF ALGIN OR PECTIN GELS

This is a continuation of application Ser. No. 74,375, filed Sept. 10, 1979, now abandoned.

The invention relates to processes for the preparation of calcium alginate and low-methoxy pectate gels, to the gels so prepared, and to edible products containing them.

In particular embodiments the invention relates to processes for preparing gels which include comminuted foodstuffs, and which can be conveniently dehydrated to serve as ingredients of food products such as for example soup mixes, with good rehydration characteristics.

UK Pat. No. 1,369,198 describes the preparation of calcium alginate and low-methoxy pectate gels by rapid mixing of appropriate sols with acid and a calcium salt insoluble under neutral but soluble under acid conditions. This produces gels with low pH, and UK Pat. No. 1,369,198 describes the exploitation of this result in the use of the process to prepare simulated fruit, where low pH is advantageous. The prior art also includes small-scale batch production of gels at a pH of about neutrality.

A general process for preparing good alginate and low-methoxy pectate gels has long been desired, particularly one capable of continuous application. It is also desirable that any such process be not restricted to acid conditions with pH <5.

It has now been found possible to formulate a new process based on the finding that rapidly mixing particles of solid calcium sulphate uniformly throughout an aqueous alginate or low-methoxy pectate sol and then allowing the mixture to gel under shear-free conditions can produce an excellent gel in a short time.

Adequate gel strength can be obtained within 30 seconds to 10 minutes after mixing although longer setting times can be appropriate. The potential gel strength obtainable from given levels of calcium ions and alginate or low-methoxy pectate can be effectively exploited. Both economically and for taste reasons it is best to use the minimum amount of these and other ingredients involved in the gelling reaction; the present process thus has a major advantage.

The invention provides a process for producing an aqueous alginate or low-methoxy pectate gel, which comprises rapidly mixing, throughout a corresponding sol, a mixture comprising a quantity of particles of a sparingly and slowly soluble solid capable of releasing an effective amount of a gelling agent into solution, mixed with finely divided foodstuff in an aqueous slurry, and then under shear-free conditions allowing the solid to release the gelling agent into solution so that the mixture forms the gel.

The speed of the rapid mixing is chosen in relation to the quantity of particles and the speed and extent of their dissolution after mixing, so that negligible gelation occurs before the establishment of shear-free conditions. In practice, this means that the formulation is designed to give a chosen final gelling time, e.g. less than 30 minutes or as little as 6 minutes, and the mixing speed chosen so that mixing is complete before gelation commences.

The solid chosen in the embodiments described below is calcium sulphate, the effective gelling agent then being the calcium ions of the dissolved calcium sulphate released into solution.

Of course, the liquid part of the mixture contains zero or insufficient gelling agent to cause gelation before the release of the effective amount of gelling agent after mixing. So where the sol is prepared in tap water it is desirable to add a sequestrant for the quantity of gelling ions normally found in such water.

An embodiment of the invention is a process for producing a gel, which comprises mixing solid calcium sulphate particles, as part of an aqueous slurry, rapidly throughout an aqueous alginate or low-methoxy pectate sol, and then under shear-free conditions allowing solid calcium sulphate to dissolve and the mixture to gel. The aqueous slurry can incorporate a comminuted, e.g. a pureed foodstuff.

In this process, it is important to ensure that solid particles of calcium sulphate are mixed before an substantial dissolution has occurred. Where an aqueous slurry of calcium sulphate particles is used, it will be found that some dissolution of the particles occurs prior to mixing, but it is highly preferred that at least the major part of the calcium sulphate remains undissolved before mixing.

Although the invention is not limited to use of gels containing foodstuffs, a particular advantage of the invention over that of GB Pat. No. 1,369,198 is that it can be used to prepare gels containing non-acid foodstuffs, including any foodstuffs which are organoleptically incompatible with acid.

Process conditions for achieving appropriate gelation are described in greater detail below.

The resulting gels are useful as foods and food ingredients, and may additionally contain further edible constituents such as flavourings, which can be introduced as components of the sol and/or the calcium sulphate slurry. Food purees and other comminuted food preparations, where present, are mixed with the calcium sulphate particles.

This process for producing a gel is not restricted to acid conditions of pH <5: it can, for example, be carried out at a pH in the range 2.5 to 8, and preferably the pH lies within the range 3.5 to 7.0, for example, where the gels produced are intended for use in edible compositions.

It has been found that embodiments of the present process can be used advantageously to prepare quantities larger than 5 kg in reasonable times, i.e. less than 30 minutes for setting, and in some cases for example about 6 minutes.

The mixing should preferably not take more than 2 minutes (measured until establishment of shear-free conditions) and good results are in many cases only achieved (depending on the gelation speed of the mixture) if the mixing is carried out sufficiently fast that it takes less than 30 seconds. Optimum times are less than 15 seconds to the establishment of shear-free conditions: when such rapid mixing is resorted to, it is possible to use correspondingly rapidly-gelling formulations.

It is a particular advantage of the present invention over prior art techniques which involve bulk-setting (i.e. gelation obtained throughout the bulk of a sol) rather than diffusion-setting (e.g. brought about by diffusion of cations into a static sol) that the process can readily be made continuous.

To obtain a continuous process, a stream of aqueous slurry of the calcium sulphate is preferably used, and mixed with a stream of the defined sol, and the mixture allowed to gel as described above while, for example, being conveyed from the mixing station in a tray or on a belt, on which it remains under shear-free conditions. The mixture should not be pumped through a pipe after gellation has commenced during gelling because of damage to the gel due to the shear forces induced.

An important factor controlling the reaction speed of the gelation is the ratio of the volume of water contributed by the sol to the volume of water contributed by the calcium sulphate slurry.

This ratio is conveniently measured as the phase volume ratio, defined as the ratio of the volume of water in the sol to the volume of water available in the slurry. The water available in the slurry is that part of the total volume of water in the slurry which is available for mixing, i.e. it does not include water bound to food material or other hydrated particles: the available water can be measured conveniently in practice, e.g. in a slurry containing a food puree or a comminuted foodstuff, by centrifuging the slurry and taking the volume of supernatant liquid as the volume of water available. Alternatively, the water available in an individual food component of a slurry can be measured in a similar way and the total water available in the complete slurry thereby calculated.

To give good mixing with presently available equipment, the volume ratio of the bulk of the sol to the bulk of the slurry is desirably for example in the range 6:1 to 1:6, particularly preferably in the range 3:1 to 1:3, especially 1.5:1 to 1:1.5. However, at the same time, it is important to avoid too rapid gelation by using a phase volume ratio (as defined above) of greater than 1:1, advantageously greater than 1.5:1, e.g. up to 3:1 and in some cases up to 9:1, 10:1 or 15:1. However, in the presence of certain retarders of the gelation speed, e.g. phosphate in the slurry, and other materials mentioned below, it may be possible to utilise lower phase volume ratios, for example 0.9:1.

In a particularly useful aspect the invention involves the use of a comminuted foodstuff. It has been appreciated that comminuted foodstuffs can advantageously be used as a base for the calcium sulphate slurry, i.e. the calcium sulphate is slurried in the comminuted foodstuff. In comminuted foodstuffs only a small proportion of the water is available for mixing; most remains bound within the foodstuff. Thus, the bulk volume ratio of the sol to the slurry can be in the advantageous range for mixing while, at the same time, the phase volume ratio (as defined above) can be advantageously high for the setting reaction. If desired, extra water can be incorporated in the slurry of calcium sulphate in the comminuted foodstuff.

Accordingly, it can be seen that in a preferred embodiment the invention provides a process for preparing a gel having a comminuted foodstuff included therein, the process comprising mixing an aqueous slurry comprising the comminuted foodstuff together with solid calcium sulphate particles, rapidly throughout a gellable aqueous alginate or low-methoxy pectate sol, and then under shear-free conditions allowing solid calcium sulphate to dissolve and the mixture to gel, wherein the bulk volume ratio between the sol and the slurry is in the range 3:1 to 1:3 while the phase volume ratio (as defined above) is greater than 1.5:1, and possibly up to 15:1. In practice the content of food puree in the mixture of sol and slurry is preferably not more than 50%.

When a comminuted foodstuff is present it may generally be found to affect the gelation time, e.g. by contributing calcium in solution, or by its content of compounds which sequester calcium.

Sometimes mixtures of sols and calcium sulphate slurries will start to gel too quickly for a particular mixer. Gelling rate can be modified. For instance, the rate can be retarded by increasing the phase volume ratio of the sol to the slurry, and vice versa; retarded by adding a soluble sulphate, e.g. sodium sulphate, to the calcium sulphate slurry; retarded by increasing the particle size or reducing the amount of the calcium sulphate; accelerated by reducing the pH; and retarded by adding calcium ion sequestrants such as citrate and phosphate. Preferably any such sequentrants are present in the sol. If to be present in the slurry, they should preferably be added not more than 1 hour before mixing of the slurry with the sol.

In practice, it has been found that convenient gelling conditions can be achieved using alginate or low-methoxy pectate concentrations in the range 0.5-2% by weight of the total mix, e.g. 1% and calcium sulphate particles in an amount in the range 0.2-1% by weight of the total mix, e.g. 0.3-0.5%, e.g. 0.4, especially where the alginate concentration is about 1%.

It has been found desirable to use solid calcium sulphate particles selected from $CaSO_4.2H_2O$ (gypsum), $CaSO_4.\frac{1}{2}H_2O$ (plaster of paris) or anhydrous calcium sulphate. Preferably the calcium sulphate, e.g. the particles of gypsum, should be in particles capable of passing a No. 10 sieve, particularly preferably a No. 40 sieve. These sieves are as defined on page F-158 of Handbook of Chemistry and Physics, 57th Edition, published by CRC Press (1976–1977). Equivalent metric sieves are given as 2.0 mm and 425 $\mu$m respectively. The smaller the particle size of the calcium sulphate the faster the reaction. Where larger sizes are used there may be a risk of discontinuous gel island formation.

A major advantage of the gels produced according to the invention is that they can be dried and that the dried pieces rehydrate rapidly. This can be used, for example, to give imitation vegetable pieces, by including comminuted vegetable in the gel pieces produced. Gel pieces produced according to examples of the methods described herein have been found, after drying, to yield a product with particularly suitable characteristics for rehydration.

The invention is illustrated by means of the following Examples.

EXAMPLE 1

Pieces of bacon-containing gel were made by the following method. An alginate phase comprising 1.0 part by weight of Manugel DMB (Trade Mark) sodium alginate obtained from Alginate Industries Limited, disodium phosphate ($Na_2HPO_4.12H_2O$) (0.2 parts by weight), and 48.8 parts by weight deionised water, was rapidly mixed in an Oakes (Trade Mark) mixer with a slurried sulphate phase containing the following ingredients:

| | |
|---|---|
| $CaSO_4.2H_2O$ | 0.45 g |
| very finely minced raw bacon | 40.00 g |
| deionised water | 9.55 |

The minced bacon contributed negligible water to the phase volume, hence the phase volume ratio was about 5.1:1.

After rapid mixing which was allowed to continue for 10 seconds, the mixture was allowed to gel under shear-free conditions for 5 minutes, resulting in a gel having bacon mince dispersed throughout its volume. The gel was sliced and fried to give slices of convenient size for consumption and of palatable flavour and texture.

In a modification of this Example, the bacon mince incorporated in the gel was cooked bacon. The product could then be heated to give a palatable product with negligible shrinkage. This example and its modification show the provision according to the invention of a palatable product incorporating meat particles in a gel matrix.

EXAMPLES 2–5

In each of these examples the procedure was as in Example 1, except for the ingredients of the alginate- and sulphate-containing phases which were as follows:

| | Example No. (contents in grams per 100g final gel) | | | |
|---|---|---|---|---|
| | 2 | 3 | 4 | 5 |
| Alginate Phase: | | | | |
| Manugel DMB (Trade Mark) | 1.0 | 1.4 | 1.0 | 1.4 |
| $Na_2HPO_4.12H_2O$ | 0.2 | — | 0.2 | 0.3 |
| Sucrose | — | — | 5.0 | — |
| Glucose monohydrate | — | — | 6.0 | — |
| Deionised water | 28.8 | 68.6 | 37.8 | 55.85 |
| Sulphate Phase: | | | | |
| Trisodium citrate dihydrate | — | 1.26 | — | — |
| $CaSO_4.2H_2O$ | 0.45 | 0.42 | 0.4 | 0.45 |
| Puree of chicken | 40.0 | — | — | — |
| Puree of tomato | — | 20.0 | — | — |
| Puree of banana | — | — | 30.0 | — |
| Puree of carrot | — | — | — | 40.0 |
| (Available water contributed by purees (ml) | 0 | 1 | 0 | 20) |
| (Phase volume ratio used | 0.98:1 | 7.4:1 | 5.7:1 | 2.8:1) |
| Sucrose | — | — | 10.0 | — |
| Colflo 67 (Trade Mark) | — | — | — | 2.0 |
| Amaizo 721AE (Trade Mark) | — | — | 3.0 | — |
| Deionised water | 29.55 | 8.32 | 6.6 | — |

Colflo (Example 5) was a modified starch from Laing-National:
Amaizo (Example 4) was pregelatinized modified starch from American Maize Product Co.

The gel product of each of Examples 2–6 was cut into convenient pieces for cooking or consumption. The bacon- and chicken-containing gels were suitable for storage under chill or in the frozen state, and for cooking, e.g. frying.

The tomato-containing pieces were suitable for frozen storage and could be heated in the oven or used as ingredients in the cookery of dishes normally containing tomato. They were also suitable for dehydration after fragmentation and the dried pieces used as an ingredient in, for example, an instant dried soup mix.

The banana-containing gel could be stored frozen and served as a quick-serve confection.

In analogous manner, the carrot-containing gel pieces could be used in cookery, e.g. by frying or baking or use in complex recipes.

The carrot- and tomato-containing gel pieces were found especially suitable for dehydration and storage at ambient temperature, and for cookery and use in dried food mixes as mentioned above.

What is claimed is:

1. In a process for producing an aqueous gel which comprises releasing a gelling agent into a gellable aqueous sol selected from the group consisting of aqueous alginate and low-methoxy-pectate sols, the improvement which comprises rapidly mixing throughout said sol an aqueous slurry of a finely divided foodstuff and calcium sulphate particles in an amount such that the calcium sulphate particles constitute 0.2 to 1% by weight of the total mix, and then under shear-free conditions allowing the calcium sulphate to release the calcium ions in solution so that the mixture is gelled, the said mixing being completed before gelation begins, the bulk volume ratio between the sol and the slurry being in the range 3:1 to 1:3, and the ratio of the volume of water in the sol to the water available in the slurry being greater than 1.5:1.

2. A process according to claim 1 wherein the pH of the gel formed is above 5.

3. A process according to claim 1 wherein the pH of the gel formed is in the range 3.5 to 7.

4. A process according to claim 1 wherein the solid particles comprise calcium sulphate dihydrate (gypsum) particles.

5. A process according to claim 1 wherein the solid comprises calcium sulphate particles of a size which will pass a metric sieve of 2.0 mm.

6. A process according to claim 5 wherein the calcium sulphate particles are of a size which will pass a metric sieve of 425 μm.

7. A process according to claim 1 wherein the solid particles comprise 0.3–0.5% of calcium sulphate particles.

8. A process according to claim 1 wherein a continuous stream of the sol is mixed rapidly with a continuous stream of the aqueous slurry and a continuous stream of the product mixture is conveyed away from the mixing station under shear-free conditions.

* * * * *